May 11, 1943.  B. L. MALLORY  2,318,873
FRICTION TYPE SHOCK ABSORBER FOR KNEE ACTION OR THE LIKE
Filed Dec. 10, 1941  3 Sheets-Sheet 3
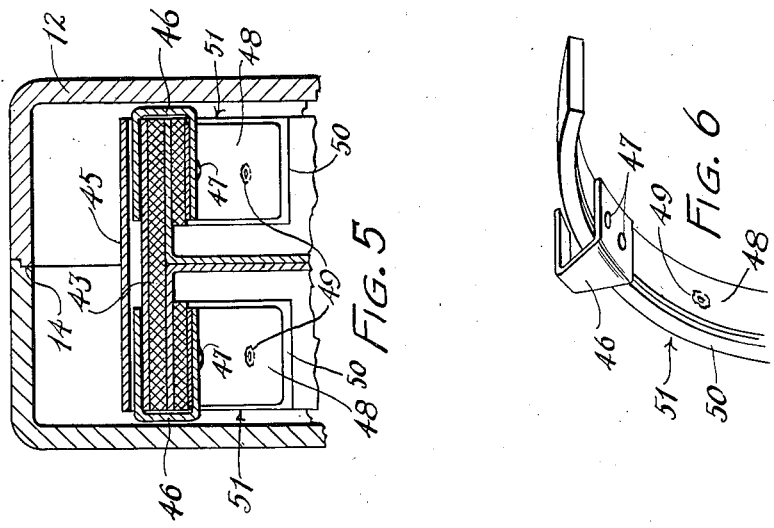
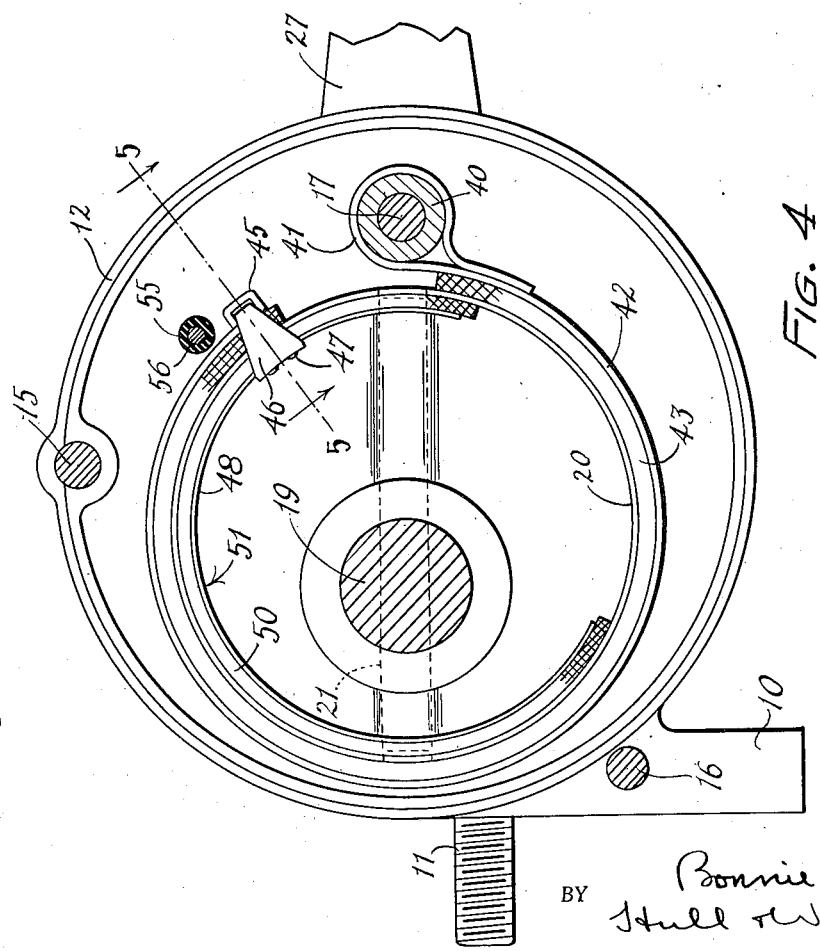
INVENTOR.
Bonnie L. Mallory
BY Hull & West
ATTORNEYS.

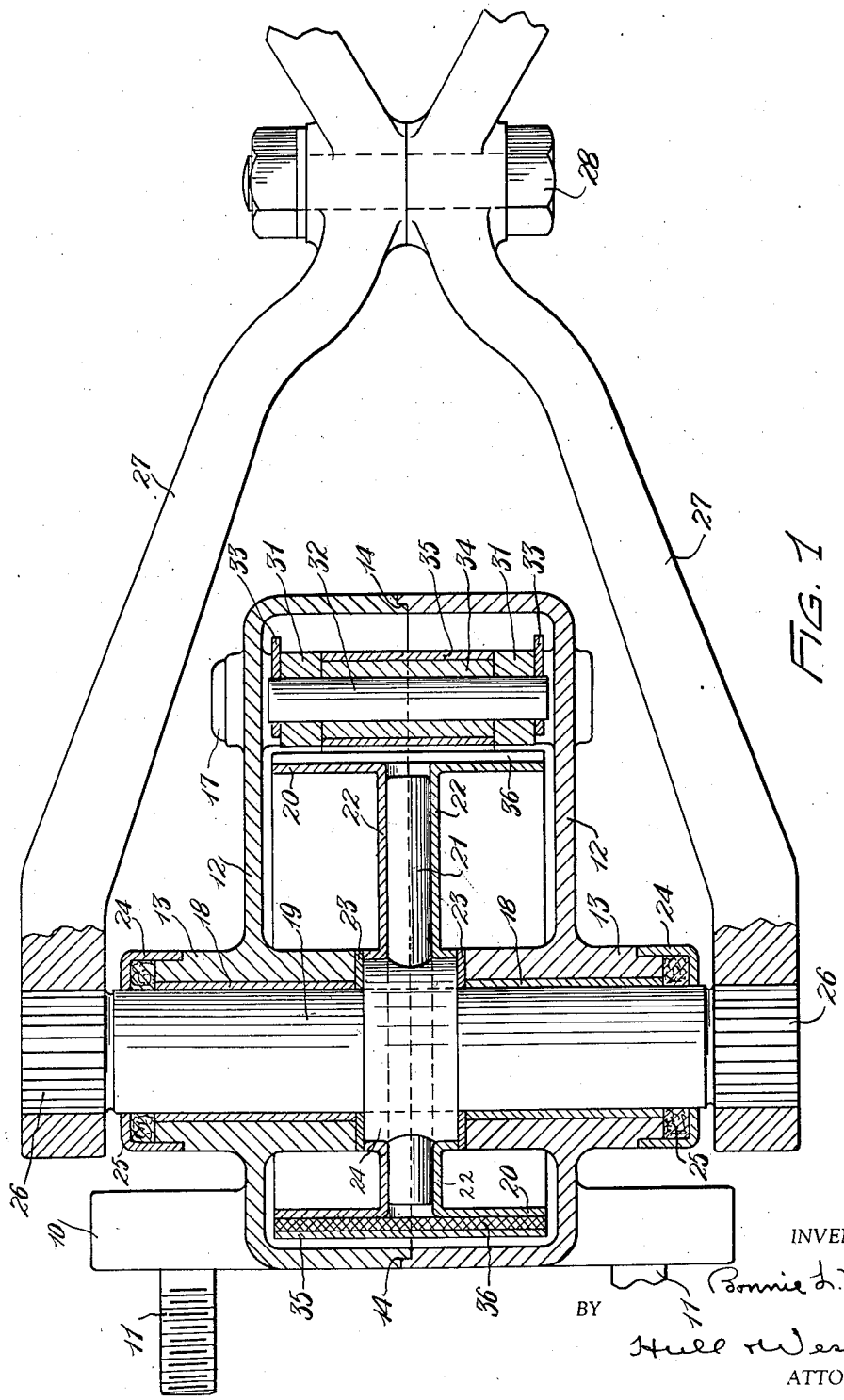

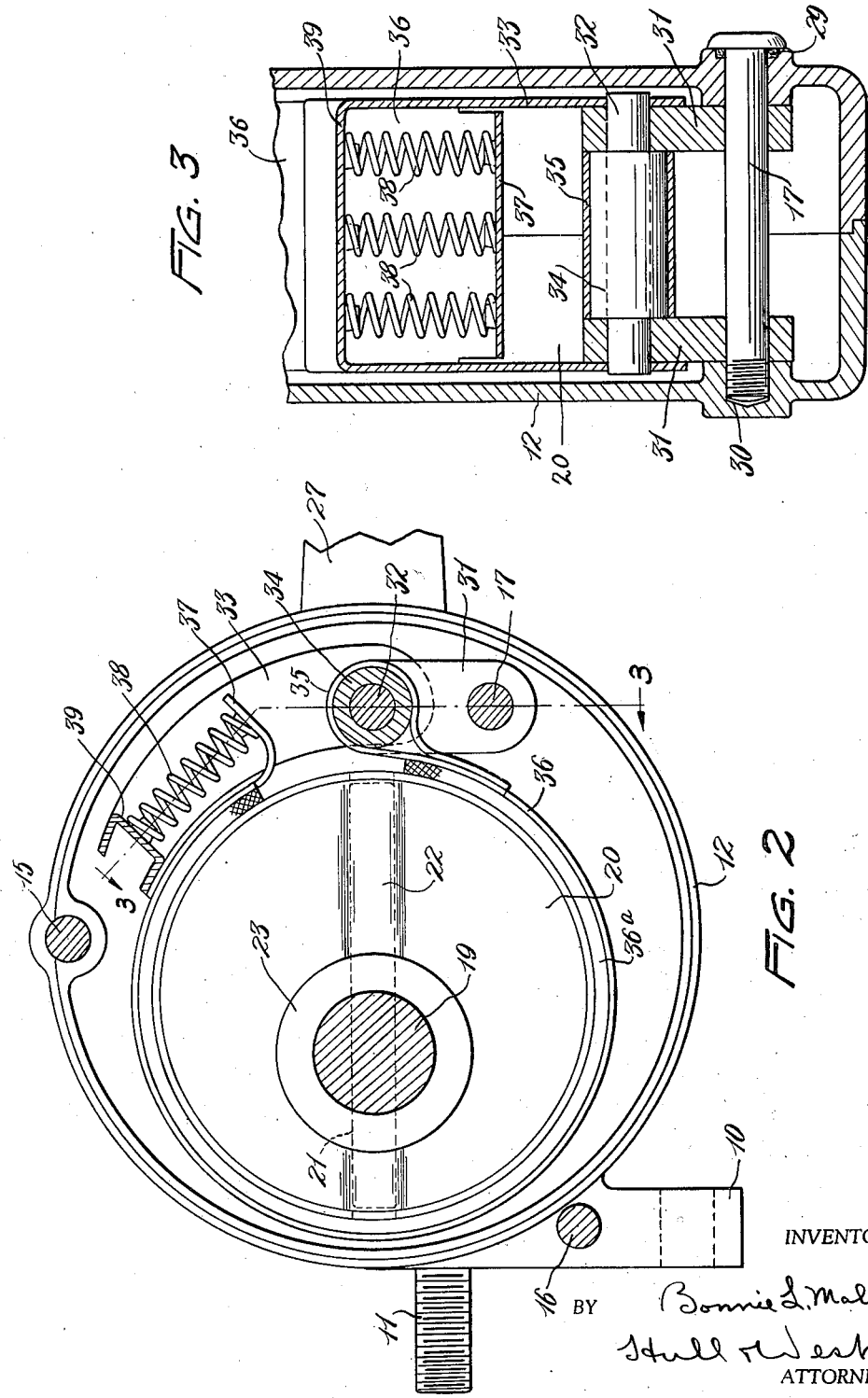
May 11, 1943.  B. L. MALLORY  2,318,873
FRICTION TYPE SHOCK ABSORBER FOR KNEE ACTION OR THE LIKE
Filed Dec. 10, 1941  3 Sheets-Sheet 2
INVENTOR.
Bonnie L. Mallory
BY
Hull & West
ATTORNEYS.

Patented May 11, 1943

2,318,873

UNITED STATES PATENT OFFICE 2,318,873

FRICTION TYPE SHOCK ABSORBER FOR KNEE ACTION OR THE LIKE

Bonnie L. Mallory, Cleveland Heights, Ohio

Application December 10, 1941, Serial No. 422,382

7 Claims. (Cl. 188—130)

This invention relates to a shock absorber designed particularly for use in connection with an individual wheel springing mechanism, such as that known as "knee-action," although capable of use in other relations where similar problems arise. A mechanism of the kind in question usually includes a mounting plate which carries journals for receiving a shaft that has secured to it the arm forming the principal support for a wheel.

It is an object of my invention to combine with such a mechanism a friction type shock absorber and to utilize the aforesaid shaft for carrying the friction or brake drum of the shock absorber. Obviously, it is good engineering to mount the shaft as close to the mounting plate as possible whereby to avoid excessive strains on the mounting plate and on the means which connects the mounting plate to the journals in which the shaft is received. Any attempt to adapt this close mounting to the conventional type of friction shock absorber is rendered impractical by the necessity of materially reducing the diameter of the shock absorber. I overcome this difficulty by mounting the friction or brake drum eccentrically on the shaft whereby the shorter radius of such drum can be placed between the shaft and the portion of the vehicle against which said mounting plate is clamped. According to one embodiment of the invention herein illustrated, I utilize a loose connection between the friction or brake band of the shock absorber and the supporting structure or, more specifically, the housing, which latter together with the mounting plate makes up said structure.

With the foregoing and other objects in view, the invention consists in the novel features of construction and arrangement of parts hereinafter described and illustrated in the accompanying drawings in which Fig. 1 is a fragmentary plan view of a wheel mounting mechanism of the knee action type embodying my invention and showing the shock absorber in central horizontal section; Fig. 2 is a central vertical section in a plane parallel to that of Fig. 1; Fig. 3 is a fragmentary section corresponding substantially to the line 3—3 of Fig. 2; Fig. 4 is a view similar to Fig. 2 of a modification; Fig. 5 is a sectional detail on the line 5—5 of Fig. 4, and Fig. 6 is a fragmentary perspective view of one of the drag shoes of the modified form of the invention.

The numeral 10 indicates a mounting plate adapted to be secured to a vehicle body as by means of bolts or studs 11. The mounting plate 10 may be conveniently made in two sections, each of which is integral with the corresponding half of a two-part housing 12 carrying journals 13. The two halves of the housing may be interfitted as indicated at 14 and tied together by means of tie bolts 15, 16 and 17. The journals 13 are provided with suitable bushings 18 which may be composed of graphite bronze whereby to be self-lubricating. Journaled in the bushings 18 is a shaft 19 to which a friction drum 20 is non-rotatably secured as by means of a pin 21. The drum 20 is made up of two cup-like members or halves, each of which is provided in its end wall with radial semi-cylindrical sockets 22 adapted to receive the pin 21. The two halves may be secured together in any suitable manner, as by uniting their end walls by spot welding. Suitable thrust washers 23 may be provided adjacent a collar 24 on the shaft 19 whereby to take up end thrust of the shaft 19. The outer ends of the journals 13 are provided with caps 24 which enclose suitable packing means 25 adapted to prevent ingress of dirt and water into the interior of the housing 12. The two ends of the shaft 19 are serrated as indicated at 26 and receive non-rotatably the branches of a double arm 27, the two branches of which are secured together by means of a bolt 28 and carry a wheel mounting (not shown) in a manner which is well understood.

The tie bolt 17 extends through one part of the housing 12 (Fig. 3), being provided with a sealing means 29 adjacent the head thereof, and less than through the other part wherewith it has screw connection as indicated at 30. This tie bolt affords means for connecting a pair of links 31 which are of such construction as to resist both tension and thrust loads. These links are rotatably mounted on the tie bolt 17 so as to have pivoting action and extend substantially tangentially of the friction or brake drum 20. Received in the other ends of the links 31 is a shaft 32 upon which is pivotally mounted a U-shaped curved yoke 33. Carried by the shaft 32 between the links 31 is a bushing 34 that is embraced by an eye 35 on one end of a friction or brake band 36, the lining of which is designated 36ª. The band 35 terminates at its opposite end in an outwardly extending abutment 37 which is disposed transversely of and within the yoke 33. Springs 38 are interposed between the abutment 37 and the bight portion 39 of the yoke 33. The friction or brake band is thus caused to grip the drum 20 in a yieldable manner and is movably connected with the housing 12.

The manner in which the foregoing device functions will be readily understood by those familiar with shock absorbers of the friction type. When the wheel that has connection with the arm 27 strikes a bump in the road it will cause the free end of said arm to be thrust upwardly thereby to impart rotation to the drum 20 in a counterclockwise direction, as the parts are viewed in Fig. 2. No appreciable resistance will be offered to such movement of the drum by the brake band 36 due to the fact that the band tends to follow the drum, the springs 38 that are interposed between the yoke 33 and the abutment 37 of the brake band readily yielding to this expanding action of the band. As soon, however, as the vehicle body to which the mounting plate 10 is secured starts to rise, relative to the wheel, and, as a consequence thereof, the drum 20 rotates in a clockwise direction, the same tendency of the brake band to follow the drum—which tendency is amplified by the action of the springs 38—will cause the brake band to tightly contract about the drum and retard its movement in the present direction, thus snubbing or checking the rebound action of the vehicle body. During the foregoing operation, the brake band 36 and yoke 33, with the connections between them, are permitted to go and come, so to speak, with the eccentrically mounted drum, due to the nature of their connection with the bolt 17 through the links 31.

In the form of the invention illustrated in Figs. 4 to 6 I have adapted the friction type shock absorber that constitutes the subject matter of my copending application, Serial No. 420,547, filed November 26, 1941, to the peculiarities of knee action. The differences between the two forms of the invention herein illustrated reside principally in the friction or brake band and the means for causing it to expand and contact when the drum is rotated in opposite directions. Therefore, the elements that remain unchanged in the second embodiment will be designated by the same reference numerals as in the first. In the present instance I prefer to dispense with the swinging connection between the anchored end of the brake band and the supporting structure or housing, and to this end shift the position of the tie bolt 17 from that which it occupies in the first described form to a position substantially in radial alignment with the longest radius of the drum 20 when the latter is in what may be regarded normal position, as shown in Fig. 4.

Mounted on the bolt 17 is a bushing 40 encircled by an eye 41 on the end of the brake band 42, the friction lining whereof is designated 43 and bears against the outer side of the drum 20. The opposite end of the brake band is provided with a rectangular loop 45 which receives at its opposite ends the outer, narrower branches of U-shaped connectors 46, to the wider base branches of which are fastened, as by rivets 47, strips 48 of relatively thin resilient metal. Fastened to the strips 48, as by rivets 49, are straps 50 of suitable friction material. Each unit made up of a connector 46, strip 48, and strap 50 may be termed a drag shoe, the same being referred to generally by the numeral 51.

Extending transversely of the housing 12 in a position to be engaged by the loop 45 when the band 42 is relaxed or expanded is a stop 55 that may consist of a piece of relatively heavy rubber tubing that is mounted on a cross pin 56.

In the operation of the present form of the invention, when the wheel that is mounted on the arm 27 strikes a bump in the road and is thereby elevated relative to the vehicle body, it causes the drum 20 to be rocked or rotated in a counterclockwise direction. When this occurs, the drag shoes 51, bearing against the inner surface of the peripheral wall of the drum 20, tend to follow the drum, the free end of the longer branch of each shoe, due to said tendency, actually withdrawing the major portion of the shoe away from the drum. This action of the drag shoes causes the brake band 42 to expand and withdraw from the drum for a considerable part of its length, such expansion being limited by the stop 55.

Immediately upon reversal of the foregoing conditions, when the vehicle body starts moving upwardly relative to the wheel and the drum 20 begins rotating in a clockwise direction, the drag shoes 51, in their tendency to follow the drum, expand against the inner surface of the peripheral wall thereof, causing them to adhere tightly to the wall and, through the connectors 46, they pull the brake band 42 tightly about the drum. This action of the brake band retards movement of the drum and snubs or checks the rebound action of the vehicle body.

Having thus described my invention, what I claim is:

1. A shock absorber for vehicles including, in combination, a housing adapted to be fixed with respect to a vehicle body, a shaft journaled in said housing, a drum eccentrically and non-rotatably carried by said shaft, link means pivoted to said housing, a yoke pivotally attached to said link means at a point spaced from its point of connection to the housing, a brake band also connected to said link means at a point spaced from its point of connection with the housing and extending about said drum and provided with an abutment extending outwardly within said yoke, compression spring means interposed between said abutment and said yoke, and an arm non-rotatably secured to said shaft and adapted to be connected with a portion of said vehicle which carries a wheel thereof.

2. In combination with an individual wheel springing mechanism including a mounting plate, journal means carried thereby closely adjacent thereto, a shaft journaled in said journal means, and an arm non-rotatably secured to said shaft; a drum non-rotatably and eccentrically carried by said shaft, a housing surrounding said drum fixed with respect to said journal means, a brake band extending about said drum, and means connecting said band loosely to said housing, said last means including a rigid link having spaced parts pivoted to said friction element and to said housing, respectively.

3. In combination with an individual wheel springing mechanism including a mounting plate, journal means carried thereby closely adjacent thereto, a shaft journaled in said journal means, and an arm non-rotatably secured to said shaft; a drum non-rotatably and eccentrically carried by said shaft, a housing surrounding said drum fixed with respect to said journal means, a brake band yieldably gripping said drum, and means connecting said band loosely to said housing, said last means including a rigid link pivoted adjacent one end to said band and adjacent the other to said housing and extending substantially tangentially of said drum.

4. In combination with an individual wheel springing mechanism including a mounting plate, journal means carried thereby closely adjacent thereto, a shaft journaled in said journal means, and an arm non-rotatably secured to said shaft; a drum non-rotatably and eccentrically carried by said shaft, a housing surrounding said drum fixed with respect to said journal means, link means pivoted to said housing, a yoke pivotally attached to said link means at a point spaced from its point of connection to the housing, a brake band also connected to said link means at a point spaced from its point of connection with the housing and extending about said drum and provided with an abutment extending outwardly within said yoke, and spring means interposed between said abutment and said yoke.

5. In combination with an individual wheel springing mechanism including a mounting plate, journal means carried thereby closely adjacent thereto, a shaft journaled in said journal means, and a branched arm having one branch non-rotatably secured to each end of said shaft; a drum non-rotatably and eccentrically carried by said shaft, a housing surrounding said drum fixed with respect to said journal means and disposed between the branches of said arm, link means pivoted to said housing, a yoke pivotally attached to said link means at a point spaced from its point of connection to the housing, a brake band also connected to said link means at a point spaced from its point of connection with the housing and extending about said drum and provided with an abutment extending outwardly within said yoke, and compression spring means interposed between said abutment and said yoke, said link means extending substantially tangentially of said drum.

6. In combination with an individual wheel springing mechanism including a mounting plate, journal means carried thereby closely adjacent thereto, a shaft journaled in said journal means, and an arm non-rotatably secured to said shaft; a drum non-rotatably and eccentrically carried by said shaft, a housing surrounding said drum fixed with respect to said journal means, a brake band extending about said drum, means connecting one end of said band to said housing, and a drag shoe frictionally engaging a part of the drum and connected to the other end of said band for tensioning the band when the drum rotates in one direction and relaxing the band when the drum rotates in the opposite direction.

7. In combination with an individual wheel springing mechanism including a mounting plate, journal means carried thereby closely adjacent thereto, a shaft journaled in said journal means, and an arm non-rotatably secured to said shaft; a hollow drum non-rotatably and eccentrically carried by said shaft, a housing surrounding said drum fixed with respect to said journal means, a brake band extending about said drum and having one end connected to the housing, and drag means frictionally engaging the inner side of the drum and connected to the other end of the brake band.

BONNIE L. MALLORY.